United States Patent Office.

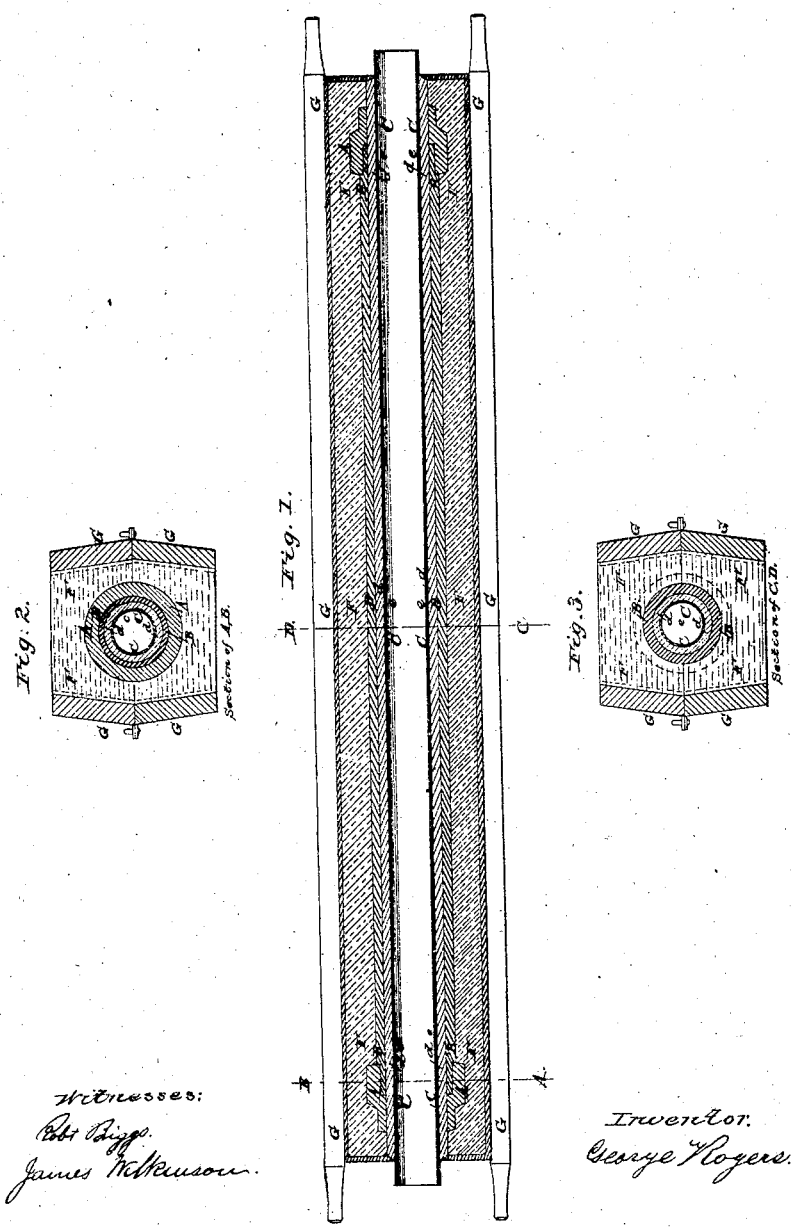

GEORGE ROGERS, OF PHILADELPHIA, PENNSYLVANIA.

Letters Patent No. 62,688, dated March 5, 1867.

---

IMPROVEMENT IN CASTING PIPES.

---

The Schedule referred to in these Letters Patent and making part of the same.

---

TO ALL WHOM IT MAY CONCERN:

Be it known that I, GEORGE ROGERS, of Philadelphia, in the county of Philadelphia, in the State of Pennsylvania, have invented a new and improved Mode of Casting Pipes for artesian or oil wells; and I do hereby declare the following to be a full and exact description thereof, reference being had to the accompanying drawings, forming part of this description, in which—

Figure 1 represents a longitudinal section through a pipe, and through the core, core-spindle, mould, chills, and flask used in making the pipe.

Figure 2 represents a section on the line A B; and

Figure 3 represents a section on the line C D.

The letters of reference indicate in all the views similar parts.

To enable others skilled in the art to use my invention, I will proceed to describe it.

My improved mode consists in the use of rings or chills of metal, as at A A, figs. 1 and 2, for forming the moulds within which are cast the ends of the pipe B B, figs. 1, 2, and 3, whereby the necessity of facing and turning off the ends for the bands (which are used in connecting any two pipes together when sinking a well,) is avoided. The completed mould (or matrix) for the pipe B B is obtained by placing the rings A A upon the core C C, (which core is formed in any customary way by a hollow core-spindle, $e\ e$, upon which is placed the hay-band, loam, sand, or other substance, $d\ d$,) in such manner as to form a truly concentric space for the ends of the pipe B B, and the whole being laid in the sand-mould F F, before made in the usual manner of the foundries, in the flask G G.

I am aware that the form of pipe shown in the drawings is that patented by J. N. Bolles, June 19, 1855, and that my improvement is applicable under and for the purposes of his patent, as well as in other forms, wherein the joints may not be made flush.

What I claim as my invention, and desire to secure by Letters Patent, is—

The use of the rings or chills A A, in the manner and for the purposes described.

GEORGE ROGERS.

Witnesses:
ROBT. BRIGGS,
JAMES WILKINSON.